United States Patent
Kim et al.

(10) Patent No.: US 9,452,929 B2
(45) Date of Patent: Sep. 27, 2016

(54) PHOTOELECTRODE INCLUDING ZINC OXIDE HEMISPHERE, METHOD OF FABRICATING THE SAME AND DYE-SENSITIZED SOLAR CELL USING THE SAME

(75) Inventors: Ki Seok Kim, Gwangju (KR); Sang Hoon Nam, Gwangju (KR); Hui Su Jeong, Gwangju (KR); Hui Song, Gwangju (KR); Sang-Mook Kim, Gwangju (KR); Won Bae Kim, Gwangju (KR); Gun Young Jung, Gwangju (KR)

(73) Assignee: GWANGJU INSTITUTE OF SCIENCE AND TECHNOLOGY, Buk-Gu (KR)

( * ) Notice: Subject to any disclaimer, the term of this patent is extended or adjusted under 35 U.S.C. 154(b) by 548 days.

(21) Appl. No.: 13/484,695

(22) Filed: May 31, 2012

(65) Prior Publication Data

US 2012/0305069 A1   Dec. 6, 2012

Related U.S. Application Data

(60) Provisional application No. 61/492,191, filed on Jun. 1, 2011.

(51) Int. Cl.
*H01L 31/0224* (2006.01)
*B82Y 30/00* (2011.01)
*B82Y 40/00* (2011.01)
*H01G 9/20* (2006.01)
*B82Y 20/00* (2011.01)

(52) U.S. Cl.
CPC ............... *B82Y 30/00* (2013.01); *B82Y 20/00* (2013.01); *B82Y 40/00* (2013.01); *H01G 9/2036* (2013.01); *H01G 9/2059* (2013.01); *Y02E 10/542* (2013.01)

(58) Field of Classification Search
CPC .... B82Y 30/00; B82Y 40/00; H01G 9/2036; H01G 9/2027; H01G 9/204; H01G 9/2059; Y02E 10/542
USPC .............. 136/263, 256; 977/948; 438/85
See application file for complete search history.

(56) References Cited

U.S. PATENT DOCUMENTS

2006/0174932 A1 *  8/2006  Usui et al. .............. 136/252

FOREIGN PATENT DOCUMENTS

WO    WO 2010024896 A2 *  3/2010

OTHER PUBLICATIONS

Law et al., J. Phys. Chem. B 2006, 110, 22652-22663.*
Chang et al., Colloids and Surfaces A: Physiicochem. Eng. Aspects 363, 2010, 22-29.*

(Continued)

*Primary Examiner* — Dujuan Horton
(74) *Attorney, Agent, or Firm* — Foley & Lardner LLP; James F. Ewing (57) ABSTRACT

Provided are a photoelectrode including a zinc oxide hemisphere, a method of fabricating the same, and a dye-sensitized solar cell using the same. The photoelectrode includes a conductive substrate, a zinc oxide hemisphere disposed on the conductive substrate, and a porous metal oxide layer covering the zinc oxide hemisphere. Light scattering effects of photoelectrodes can be increased, and recombination losses of electrons can be minimized to improve photovoltaic properties.

4 Claims, 8 Drawing Sheets

(56) References Cited

OTHER PUBLICATIONS

Cheng et al., Formation of branched ZnO nanowires from solvothermal method and dye sensitized solar cells applicatoins, J. Phys. Chem. C, vol. 112, 2008, p. 16359-16364.*

Andeen et al., Lateral Epitaxial Overgrowth of ZnO in Water at 90° C**., Adv. Funct. Mater. 2006, 16, 799013804.

Banfield et al., Aggregation-Based Crystal Growth and Microstructure Development in Natural Iron Oxyhydroxide Biomineralization Products; Science vol. 289 Aug. 4, 2000, 751-754.

Chen et al., Mesoporous Anatase TiO2 Beads with High Surface Areas and Controllable Pore Sizes: A Superior Candidate for High-Performance Dye-Sensitized Solar Cells, Adv. Mater. 2009, 21, 22060132210.

De Angelis et al., Absorption Spectra and Excited State Energy Levels of the N719 Dye on TiO2 in Dye-Sensitized Solar Cell Models, J. Phys. Chem. C 2011, 115, 88250138831.

Degen et al., EFect of pH and impurities on the surface charge of zinc oxide in aqueous solution, Journal of the European Ceramic Society 20 (2000) 667-673.

Fu et al., Dye-Sensitized Back-Contact Solar Cells, Adv. Mater. 2010, 22, 42700134274.

Gratzel, Solar Energy Conversion by Dye-Sensitized Photovoltaic Cells, Inorganic Chemistry, vol. 44, No. 20, 2005 6841-6843.

Han et al., Modeling of an equivalent circuit for dye-sensitized solar cells, Applied Physics Letters vol. 84, No. 13 Mar. 29, 2004.

Hore et al., Influence of scattering layers on efficiency of dye-sensitized solar cells, Solar Energy Materials & Solar Cells 90 (2006) 1176-1188.

Hosono et al., The Fabrication of an Upright-Standing Zinc Oxide Nanosheet for Use in Dye-Sensitized Solar Cells, Adv. Mater. 2005, 17, 2091-2094.

Hu et al., Microstructure Design of Nanoporous TiO2 Photoelectrodes for Dye-Sensitized Solar Cell Modules, J. Phys. Chem. B 2007, 111, 358-362.

Huang et al., Dual-Function Scattering Layer of Submicrometer-Sized Mesoporous TiO2 Beads for High-Efficiency Dye-Sensitized Solar Cells, Adv. Funct. Mater. 2010, 20, 13010131305.

Ito et al., Fabrication of thin film dye sensitized solar cells with solar to electric power conversion efficiency over 10%, Thin Solid Films 516 (2008) 46130134619.

Kang et al., Dependence of TiO2 Film Thickness on Photocurrent-Voltage Characteristics of Dye-Sensitized Solar Cells, Bull. Korean Chem. Soc. 2004, vol. 25, No. 5, 742-744.

Kern et al., Modeling and interpretation of electrical impedance spectra of dye solar cells operated under open-circuit conditions, Electrochimica Acta 47 (2002) 4213-4225.

Kim et al., Effects of Organic Additive during Thermal Reduction of Platinum Electrodes for Dye-Sensitized Solar Cells, Materials Transactions, vol. 51, No. 12 (2010) pp. 2322 to 2324.

Kim et al., Polymer-Templated Hydrothermal Growth of Vertically Aligned Single-Crystal ZnO Nanorods and Morphological Transformations Using Structural Polarity, Adv. Funct. Mater. 2010, 20, 30550133063.

Kroon et al., Nanocrystalline Dye-sensitized Solar Cells Having Maximum Performance, Prog. Photovolt: Res. Appl. 2007; 15:101318.

Kuang et al., High Molar Extinction Coefficient Heteroleptic Ruthenium Complexes for Thin Film Dye-Sensitized Solar Cells, 4146 9 J. Am. Chem. Soc. 2006, 128, 4146-4154.

Law et al., Nanowire dye-sensitized solar cells, nature materials, vol. 4, Jun. 2005, 455-459, www.nature.com/naturematerials.

Li, Quanchang, et al, Fabrication of ZnO Nanorods nad Nanotubes in AqueousSolutions, Chem. Mater. 2005, 17, 1001-1006.

Lin et al., Improving the durability of dye-sensitized solar cells through back illumination, Journal of Power Sources 196 (2011) 16710131676.

Liu et al., Hydrothermal Synthesis of ZnO Nanorods in the Diameter Regime of 50 nm, J. Am. Chem. Soc. 2003, 125, 4430-4431.

M. Muruganandham et al.,Solar photocatalytic degradation of a reactive azo dye in TiO2- suspension,Science Direct, Solar Energy Materials 7 Solar Cells, 81, (2004) 439-457, Elsevier B.V., Nov. 22, 2003.

Martinson et al., ZnO Nanotube Based Dye-Sensitized Solar Cells, Nano Letters, 2007, vol. 7, No. 8, 2183-2187.

Nazeeruddin et al., Combined Experimental and DFT-TDDFT Computational Study of Photoelectrochemical Cell Ruthenium Sensitizers, J. Am. Chem. Soc. 2005, 127, 16835-16847 9 16835-16847.

Nelson et al., Random walk models of charge transfer and transport in dye sensitized systems, J. Nelson, R.E. Chandler / Coordination Chemistry Reviews 248 (2004) 11810131194.

Nissfolk et al., Recombination and Transport Processes in Dye-Sensitized Solar Cells Investigated under Working Conditions, J. Phys. Chem. B, vol. 110, No. 36, 2006, 17715-17718.

O'Regan et al., A Low-cost, High-efficiency Solar Cell Based on Dye-sensitized Colloidal TiO2 Films, Nature, vol. 353, Oct. 24, 1991, 737-740.

Palomares et al., Heterogeneous colorimetric sensor for mercuric salts, Chem. Commun., 2004, 362013363.

Park et al., Effect of an Ultrathin TiO2 Layer Coated on Submicrometer-Sized ZnO Nanocrystallite Aggregates by Atomic Layer Deposition on the Performance of Dye-Sensitized Solar Cells, Adv. Mater. 2010, 22, 23290132332.

Penn et al., Imperfect Oriented Attachment: Dislocation Generation in Defect-Free Nanocrystals, Science 281, 969-971 (1998).

Saito et al., Large photocurrent generation in dye-sensitized ZnO solar cells, Energy Environ. Sci., 2008, 1, 280013283 | 281.

Sauvage et al., Dye-Sensitized Solar Cells Employing a Single Film of Mesoporous TiO2 Beads Achieve Power Conversion Efficiencies Over 10%, www.acsnano.org, vol. 4, No. 8, 44200134425, 2010.

Seung Hwan Ko et al., Nanoforest of Hydrothermally Grown Hierarchical ZnO Nanowires for a High Efficiency Dye-Sensitized Solar Cell, Nano Lett. 2011, 11, 666013671, 020Applied Nano Technology and Science Lab, Department of Mechanical Engineering, KAIST (Korea Advanced Institute of Science and Technology), 291 Daehak-ro, Yuseong-gu, 305-701, Korea §Laser Thermal Laboratory, Department of Mechanical Engineering, University of California, Berkeley, California 94720-1740, United States.

Wang et al., Electrochemical Impedance Spectroscopic Analysis of Dye-Sensitized Solar Cells; J. Phys. Chem. B 2005, 109, 14945-14953.

Wang et al., Significant influence of TiO2 photoelectrode morphology on the energy conversion efficiency of N719 dye-sensitized solar cell, Coordination Chemistry Reviews 248 (2004) 13810131389.

Wang, Zhong Lin, Zinc oxide nanostructures: growth, properties and applications, J. Phys.: Condens. Matter 16 (2004) R829013R858 PII: S0953-8984(04)58969-5.

Xiao et al., The preparation of titania nanotubes and its application in flexible dye-sensitized solar cells, Electrochimica Acta 55 (2010) 45730134578.

Zhang et al., Aggregation of ZnO Nanocrystallites for High Conversion Efficiency in Dye-Sensitized Solar Cells, Angew. Chem. Int. Ed. 2008, 47, 2402 0132406.

Zhang et al., Polydisperse Aggregates of ZnO Nanocrystallites: A Method for Energy-Conversion-Efficiency Enhancement in Dye-Sensitized Solar Cells, Adv. Funct. Mater. 2008,18 16540131660.

Zhang et al., ZnO Nanostructures for Dye-Sensitized Solar Cells, Adv. Mater. 2009, 21, 40870134108.

Zhifeng Liu, et al., Controlled Synthesis of ZnO and TiO2 nanotubes by chemical method and their application in dye-sensitized solar cells,Renewable Energy 36 (2011) 1177-1181, Department of Materials Science and Engineering, Tianjin Institute of Urban Construction, Tianjin 300384, China.

* cited by examiner

PHOTOELECTRODE INCLUDING ZINC OXIDE HEMISPHERE, METHOD OF FABRICATING THE SAME AND DYE-SENSITIZED SOLAR CELL USING THE SAME

CROSS-REFERENCE TO RELATED APPLICATION

This application claims the benefit of U.S. Provisional Application No. 61/492,191, filed on Jun. 1, 2011, the entire contents of which are hereby incorporated by reference.

BACKGROUND

1. Technical Field

The present invention relates in general to the field of a photoelectrode, a method of fabricating the same, and applications of the photoelectrode, and more specifically to a photoelectrode including a zinc oxide (ZnO) hemisphere, a method of fabricating the same, and a dye-sensitized solar cell (DSSC) using the same.

2. Related Art

Since the pioneering work of O'Regan and Grätzel in 1991, numerous research studies have investigated dye-sensitized solar cells (DSSCs) as an alternative, next generation solar cell. This evolution has continued to progress, and solar light-to-electricity conversion efficiency (power conversion efficiency (PCE)) has now exceeded 11%. DSSCs have recently garnered increasing attention as an ideal photovoltaic concept; the advantages of DSSCs are low-cost, transparency, color rendition, eco-friendly process, bio-compatibility and simplicity. Generally, improvements in overall PCE have focused on increasing photovoltage through modification of an oxide layer, improving photocurrent with new dye molecules, developing new electrolytes, and increasing stability by cell configurations.

A transparent mesoporous titanium dioxide ($TiO_2$) nanoparticulate layer is a well-known photoelectrode (photoanode) material used in conventional DSSCs. However, the small $TiO_2$ nanoparticulate layer with a diameter of about 20 nm, which is transparent to visible light, weakly scatters light due to the small particle size. As a result, a substantial portion of incident light passes through the $TiO_2$ nanoparticulate layer without being captured and utilized to produce photo-current.

Many studies have focused on capturing more light in a photoelectrode film using sub-micron poly-dispersed oxide particle aggregates, which act as effective scattering centers, and/or using gradient scattering layers consisting of $TiO_2$ nano-particles with different radii along the path of light. Although the utilization of the larger sized aggregates within the photoelectrode film with a thickness of about 9 μm and a cell area of about 1 $cm^2$ enhances PCE to 5.4%, due to the improved light scattering, the aggregates decrease the total surface area and therefore the dye adsorption to the aggregates is also decreased.

Improvement in PCE of DSSCs is also hindered by energy losses due to the recombination of produced electrons with both oxidized dye molecules and electron-accepting components in an electrolyte during a charge transport process. The recombination problem becomes significant with the thickness of the photoelectrode film. Although the thick film can contain more dyes for enhancing light harvest, it inherently contains cracks and encounters mass transport limitation of a redox electrolyte, thereby reducing the photovoltage of the cell.

To overcome the recombination issue in the thick particulate film, ZnO nanostructure-incorporated photoelectrodes have recently been studied; nano-wires, nano-tubes, or nano-trees. ZnO is a wide bandgap semiconductor that has an energy-band and physical properties similar to those of $TiO_2$. Interestingly, by controlling a growth process, a ZnO crystal structure (wurtzite) enables various morphological changes: nanorod, nanoribbon, nanobelt, nanocomb and so on, during the growth, which is not possible with the crystal structures of $TiO_2$ (either anatase or rutile). Such various nanostructures present their distinguished performances in photovoltaic devices by providing higher electron mobility or larger surface area. One-dimensional nanostructures of ZnO are favorable for fast electron transport with reduced recombination losses by providing direct conduction pathways to the collecting electrode.

However, conventionally reported DSSCs with various ZnO nanostructure-incorporated photoelectrodes have not yielded higher PCE (%) than $TiO_2$-film photoelectrode. In the case of conventional photoelectrodes composed of ZnO nanostructures, the nanostructures are not spatially arranged but inter-connected, and a surface area where dyes can be adsorbed is smaller than that of a nanoparticulate film.

The ZnO crystalline structure is intrinsically weak to an acidic dye solution (pH of ca. 5~6), which is the crucial drawback for the application of ZnO for DSSCs; the origin of $Zn^{2+}$/dye aggregation causes a low open-circuit voltage and a poor long-term stability. Therefore, ZnO nanostructure-incorporated photoelectrodes coated with a $TiO_2$ film to provide the fast electron transport of the ZnO nanostructures, the large dye adsorption of the $TiO_2$ film, and a resistance to an acidic dye solution have been explored.

In general, although light is irradiated to the photoelectrode, a $TiO_2$ nanoparticulate film serves as a photo-catalyst to degrade the properties of a dye under UV irradiation. However, when light is irradiated to a catalytic electrode, an electrolyte can absorb most UV light before the light reaches the photoelectrode to prevent degradation of the dye, resulting in long-term stability of device performance.

SUMMARY

Accordingly, the present invention is provided to substantially obviate one or more problems due to limitations and disadvantages of the related art.

The present invention relates to a photoelectrode having high photoelectric conversion efficiency, a method of fabricating the same, and a dye-sensitized solar cell (DSSC) using the same.

One aspect of the present invention provides a photoelectrode including: a conductive substrate; a zinc oxide (ZnO) hemisphere disposed on the conductive substrate; and a porous metal oxide layer covering the zinc oxide hemisphere.

The zinc oxide hemisphere may include a plurality of zinc oxide nanorods formed radially from the center of the zinc oxide hemisphere. Each of the zinc oxide nanorods may have a single crystalline structure.

Another aspect of the present invention provides a method of fabricating a photoelectrode including: forming a zinc oxide seed layer on a conductive substrate; forming a zinc oxide hemisphere on the zinc oxide seed layer using a hydrothermal growth process; and forming a porous metal oxide layer on the substrate having the zinc oxide hemisphere.

The formation of the zinc oxide seed layer may include depositing a zinc metal on the conductive substrate and oxidizing the zinc metal.

The formation of the zinc oxide hemisphere may include dipping the zinc oxide seed layer in a first growth culture solution and radially growing a plurality of zinc oxide nanorods from the seed layer and dipping the radially grown zinc oxide nanorods in a second growth culture solution containing a vertical growth inhibitor to facilitate lateral growth of the zinc oxide nanorods.

Still another aspect of the present invention provides a DSSC including: the above-described photoelectrode; a photosensitive dye adsorbed on the photoelectrode; a catalytic electrode disposed opposite the photoelectrode; and an electrolyte interposed between the photoelectrode and the catalytic electrode.

BRIEF DESCRIPTION OF DRAWINGS

The present invention will become more apparent by describing in detail example embodiments of the present invention with reference to the accompanying drawings, in which.

DETAILED DESCRIPTION OF THE INVENTION

Example embodiments of the present invention are disclosed herein. However, specific structural and functional details disclosed herein are merely representative for purposes of describing example embodiments of the present invention. Example embodiments of the present invention may be embodied in many alternate forms and should not be construed as limited to example embodiments of the present invention set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

It will be understood that, although the terms first, second, etc. may be used herein to describe various elements, these elements should not be limited by these terms. These terms are only used to distinguish one element from another. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Descriptions of well-known components and processing techniques are omitted so as not to unnecessarily obscure the substance of the present invention.

Fabrication of a Photoelectrode

FIGS. 1A through 1D are cross-sectional views illustrating a method of fabricating a photoelectrode 100 according to an example embodiment of the present invention.

Figure 1A:
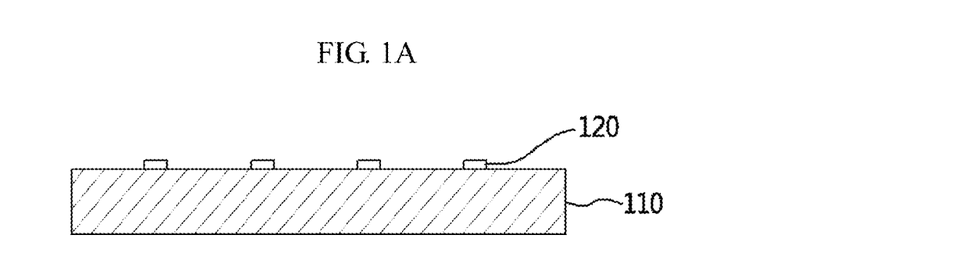
FIGS. 1A through 1D are cross-sectional views illustrating a method of fabricating a photoelectrode according to an example embodiment of the present invention.

Referring to FIG. 1A, a zinc oxide (ZnO) seed layer 120 may be formed on a conductive substrate 110. The conductive substrate 110 may be any substrate having electrical conductivity and capable of supporting the photoelectrode 100 fabricated according to the present embodiment with no particular limitation. The conductive substrate 110 may have a single structure or multilayered structure. As an example of the multilayered structure, the conductive substrate 110 may be obtained by coating a transmissive substrate with a conductive metal oxide layer formed of indium tin oxide (ITO), fluorine-doped tin oxide (FTO), $ZnO$—$Ga_2O_3$, $ZnO$—$Al_2O_3$, or $SnO_2$—$Sb_2O_3$. The conductive metal oxide layer may serve as a collecting electrode configured to receive photoelectrons generated by exciting a dye with light.

The seed layer 120, which may be a base layer on which a ZnO nanostructure is grown, may be formed using various methods.

In an example, the formation of the seed layer 120 may include depositing a zinc metal on the conductive substrate 110 and oxidizing the zinc metal. The oxidation of the zinc metal may be performed by bringing a basic solution, preferably a solution having a pH value of 10 or higher, into contact with the zinc metal. In another example, the seed layer 120 may be formed on the substrate 110 by performing a sputtering process on a ZnO target. In another example, the seed layer 120 may be formed by coating ZnO particles obtained using a hydrothermal synthesis process on the substrate 110.

Furthermore, in addition to the above-described methods, the seed layer 120 may be formed using various physical or chemical deposition methods.

Figure 2A:
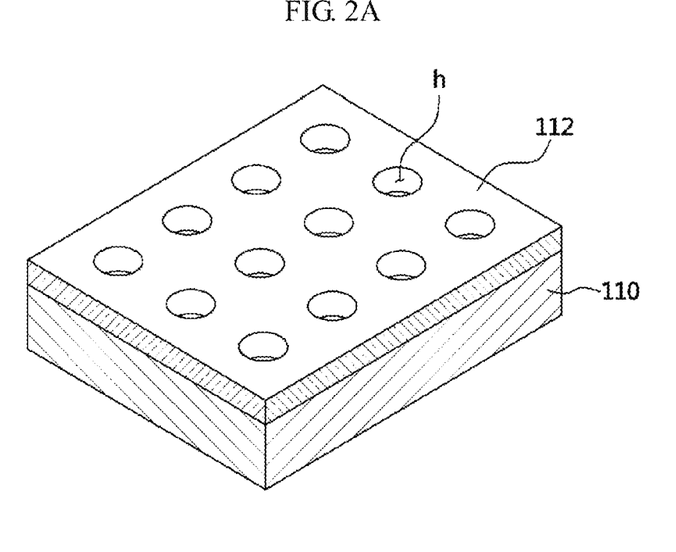
FIGS. 2A and 2B are perspective views illustrating a method of forming a zinc oxide (ZnO) seed layer patterned as an array of dots.
Figure 2B:
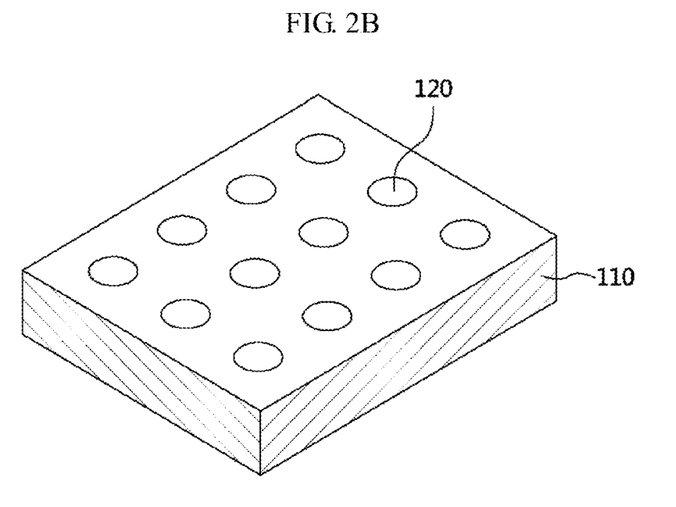

As shown in FIG. 1A, the seed layer 120 may have a shape patterned as a predetermined array. The seed layer 120 may be formed by various processes using a photoresist and lithography. For example, as shown in FIGS. 2A and 2B, a photoresist 112 having an array of holes (h) may be formed on the conductive substrate 110 using a photolithography technique or a laser interference lithography technique (refer to FIG. 2A). Thereafter, a seed material may be deposited within the holes (h) and a ZnO seed layer 120 may be formed using a lift-off process (refer to FIG. 2B). As a result, the seed layer 120 may have a shape patterned as an array of dots. Meanwhile, when the deposited seed material is a zinc metal, a process of oxidizing the zinc metal may be further performed.

Conversely, a seed layer may be initially formed on a conductive substrate, a pillar-type resist pattern may be formed on the seed layer, and the underlying seed layer may be etched using the pillar-type resist pattern as an etch mask to form a seed layer patterned as an array of dots.

Next, a ZnO hemisphere (ZHS) 140 may be formed on the seed layer 120 using a hydrothermal growth process. The ZHS 140 may be formed using a two-step hydrothermal growth process.

Figure 1B:
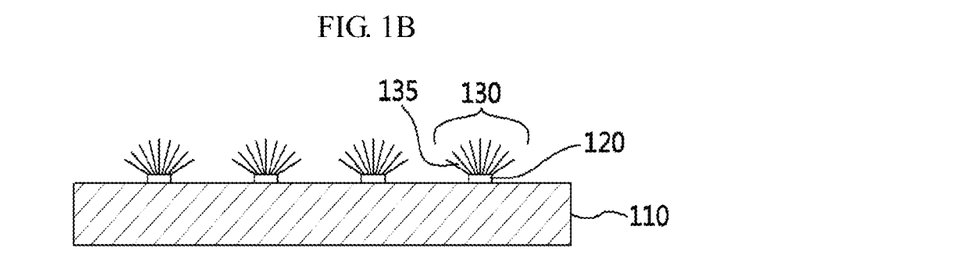

Referring to FIG. 1B, a plurality of ZnO nanorods 135 may be radially grown from the seed layer 120. The growth of the ZnO nanorods 135 may be performed by dipping the seed layer 120 in a first growth culture solution. During this process, an urchin-like ZnO nanostructure may be formed. The urchin-like ZnO nanostructure composed of a bundle 130 of radial nanorods is formed because there is no preferred c-axis orientation in the ZnO seed layer 120 due to the crystal mismatch at the surface of the conductive substrate 110. Each of the grown ZnO nanorods 135 may have a single crystalline structure.

The first growth culture solution may be a solution containing a first zinc ion donor and a first hydroxide ion donor. The first zinc ion donor may include zinc salts, such as zinc acetate, zinc nitrate, zinc sulfate, or zinc chloride. The first hydroxide ion donor may include NaOH, $Na_2CO_3$, LiOH, $H_2O_2$, KOH, hexamethylenetetramine (HMTA), or $NH_4OH$. A solvent for the first growth culture solution may preferably be a polar solvent and contain water, alcohol, or any other polar organic solvent.

Figure 1C:
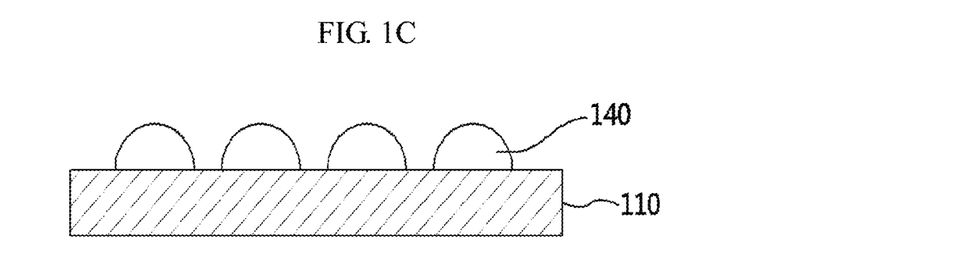

Referring to FIG. 1C, a ZHS 140 may be formed from the radially grown ZnO nanorods. The formation of the ZHS 140 may be performed by dipping the ZnO nanorods in a second growth culture solution containing a vertical growth inhibitor. During this process, lateral growth of the ZnO nanorods may be facilitated, and gaps within the bundle 130 of nanorods may be filled to form the ZHS 140.

The second growth culture solution may be a solution containing a second zinc ion donor, a second hydroxide ion donor, and a vertical growth inhibitor. The second zinc ion donor, the second hydroxide ion donor, and a solvent for the second growth culture solution may be independently selected within the ranges of examples of materials that may form the first zinc ion donor, the first hydroxide ion donor, and the solvent for the first growth culture solution irrespective of the composition of a material of the first growth culture solution.

The vertical growth inhibitor may include ionic species, such as an anionic polymer, citrate anions, or alkoxy anions. The species ions may be electrochemically adhered to positively charged top planes ($Zn^{2+}$-terminated) of ZnO nanorods and thus retarded c-axial [0001] directional growth of the nanorods. Accordingly, the lateral growth of the nanorods may become dominant during hydrothermal growth of a culture solution containing the vertical growth inhibitor. As a result, the gaps within the bundle 130 of nanorods may be filled to form the ZHS 140. Since the ZHS 140 is formed by merging the formed single crystalline ZnO nanorods, the properties of single crystalline nanorods, such as high carrier mobility, may be maintained.

Meanwhile, the lateral growth of the ZnO nanorods may be performed at a pH value higher than an isoelectric point (IEP) of ZnO. When the culture solution has a pH value higher than the isoelectric point (IEP) of ZnO (8.7 to 9.5), the side planes of ZnO nanorods become electrochemically negative. As a result, the vertical growth inhibitor may electrochemically selectively react with the positively charged top planes of ZnO nanorods.

Figure 1D:
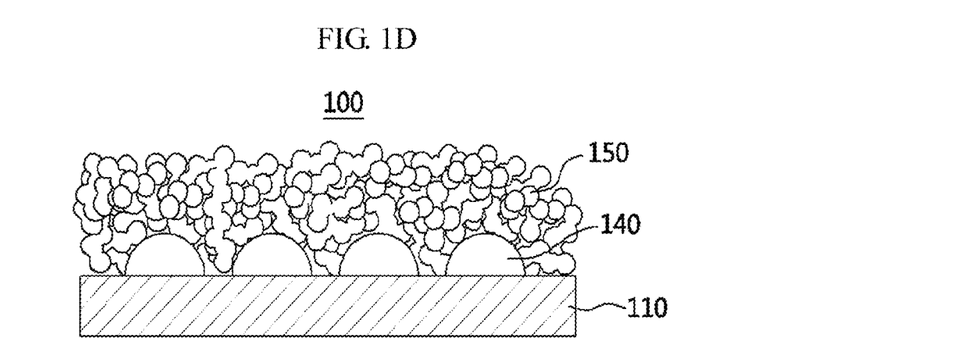

Referring to FIG. 1D, a porous metal oxide layer 150 may be formed on the substrate 110 having the ZHS 140.

The metal oxide layer 150 may include various materials having a semiconductor property, for example, at least one selected from the group consisting of titanium oxide, tin oxide, zinc oxide, tungsten oxide, zirconium oxide, strontium oxide, indium oxide, magnesium oxide, and aluminum oxide. The metal oxide layer 150 may have a thickness of about 1 to 30 μm.

The formation of the metal oxide layer 150 may be performed using various methods. Preferably, the formation of the metal oxide layer 150 may include coating the substrate 110 with a metal oxide paste containing metal oxide nanoparticles and performing an annealing process. The annealing process may be performed at a temperature at which the metal oxide nanoparticles are sintered.

Since the metal oxide layer 150 is formed to cover the ZHS 140, the metal oxide layer 150 may function as a protection layer of the ZHS 140. That is, since the ZHS 140 remains coated with the metal oxide layer 150, generation of $Zn^{2+}$/dye aggregation may be inhibited, and photoelectrons generated by light-sensitizing a dye may be rapidly transported through single crystalline hemispheres to a collecting electrode.

Application of Photoelectrode for Dye-Sensitized Solar Cell

According to another embodiment of the present invention, a dye-sensitized solar cell (DSSC) is provided.

Figure 3:
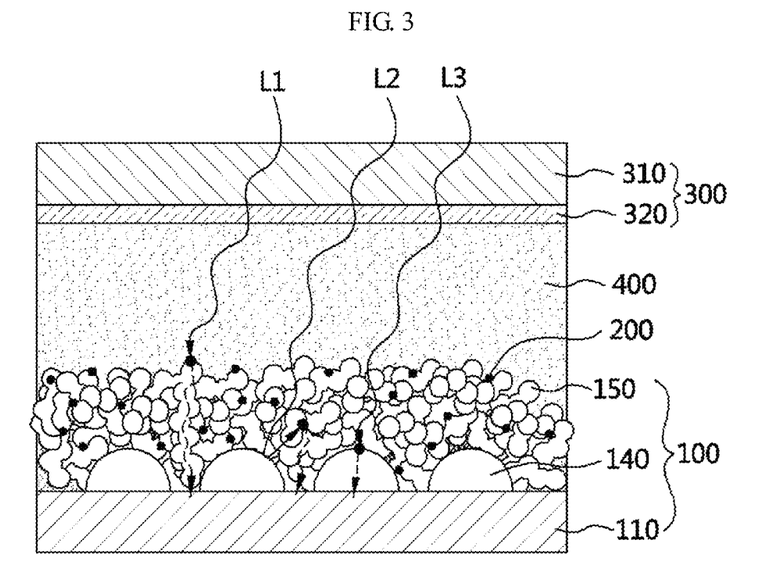
FIG. 3 is a cross-sectional view of a dye-sensitized solar cell (DSSC) according to an example embodiment of the present invention.

FIG. 3 is a cross-sectional view of a DSSC according to the present embodiment. Referring to FIG. 3, the DSSC may include a photoelectrode 100, a photosensitive dye 200 adsorbed onto the photoelectrode 100, a catalytic electrode 300 disposed opposite the photoelectrode 100, and an electrolyte interposed between photoelectrode 100 and the catalytic electrode 300.

The photoelectrode 100 may be fabricated using the above-described method. That is, the photoelectrode 100 may include a conductive substrate 110, a ZHS 140 disposed on the conductive substrate 100, and a porous metal oxide layer 150 covering the ZHS 140.

The dye 200, which may be a material capable of absorbing incident light and forming electron-hole pairs, may include a ruthenium (Ru)-based dye such as N719; an organic dye such as coumarin, porphyrin, xanthene, riboflavin, or triphenyl methane; or an inorganic dye using quantum dots, such as indium phosphide (InP) or cadmium selenide (CdSe). However, any dye capable of efficiently absorbing solar light and emitting electrons may be used with no particular limitation.

The dye 200 may be adsorbed onto the photoelectrode 100, specifically, the ZHS 140 and/or the metal oxide layer 150, by spraying or coating a solution containing the dye 200 on the photoelectrode 100 or by dipping the photoelectrode 100 in a solution containing the dye 200.

The catalytic electrode 300 may include a conductive substrate 310 and a catalytic layer 320 formed on the conductive substrate 310. The conductive substrate 310 may be the same as an example of the conductive substrate 110 of the photoelectrode 100. The catalytic layer 320 may serve as a catalyst configured to facilitate a reduction reaction of redox species contained in an electrolyte. The catalytic layer 320 may include a metal, an active carbon, or carbon nanotubes. For example, the catalytic electrode 300 may be an FTO substrate coated with a platinum catalyst layer.

The electrolyte 400 may include $I^-/I_3^-$ redox species and a liquid or polymer medium and be formed of known materials used as electrolytes of DSSCs.

Meanwhile, at least one of the photoelectrode 100 and the catalytic electrode 300 has transmittance. In particular, the catalytic electrode 300 may preferably have a high transmittance to enable back illumination through the catalytic electrode 300. When sunlight is incident through the catalytic electrode 300, since the electrolyte 400 may absorb UV light before the sunlight reaches the photoelectrode 100, degradation or decomposition of the dye 200 adsorbed on the photoelectrode 100 may be inhibited to ensure long-term device stability.

In an example embodiment, the catalytic electrode 300 may include a catalytic layer 320 disposed on a transparent conductive substrate 310. The catalytic layer 320 may be formed by coating the transparent conductive substrate 310 with a catalytic precursor solution containing metal salts and a cellulose-based polymer and annealing the catalytic precursor solution. The cellulose-based polymer may be a hydroxyalkyl cellulose or derivative thereof, preferably, hydroxypropyl cellulose (HPC). The annealing process may be performed at a temperature at which the cellulose-based polymer may thermally decompose. After thermal decomposition, metal nanoparticles may be homogeneously dispersed to form the catalytic layer 320. In this case, since the catalytic layer 320 may have a high transmittance, the transmittance of the catalytic electrode 300 may be enhanced.

FIG. 3 shows three different light modes L1 to L3 for photocurrent generation in DSSC. L1 represents light that directly excites the dyes 200 adsorbed at the metal oxide nanoparticulate layer 150. In this mode, produced electrons push their way through nanoparticle boundaries to reach the conductive substrate 110. During migration, when coming across the ZHS 140, the electrons travel rapidly through the crystalline ZHS 140 to the conductive substrate 110. L2 represents scattered light at the boundaries of the ZHS 140. The scattered light can be recycled for additional photocurrent generation. Finally, L3 represents light that penetrates the metal oxide nanoparticulate layer 150 and excites the dyes interfacing the ZHS 140. In this case, the produced electrons move with high mobility through the single crystalline ZnO nanorods that constitute the ZHS 140.

That is, in the DSSC according to the present invention, due to light scattering effects caused by the induction of the ZHS 140, an optical path length can increase within the metal oxide nanoparticulate layer 150 and thus more light can be recycled to excite more dyes. Also, since the ZHS 140 have high electron mobility, energy losses due to recombination problems during a charge transport process can be minimized. These factors may lead to improvements in photovoltaic characteristics.

The present invention will now be described in more detail with reference to the following experimental examples. However, the present invention is not restricted by the following experimental examples.

Fabrication of Polymer Template

A laser interference lithography technique was used to fabricate a periodic polymer hole array on an FTO-coated glass substrate. A negative tone photoresist (PR, AZ nlof 2020®, AZ electronic materials) was diluted with a thinner (AZ 1500® thinner, AZ Electronic Materials) at a volume ratio of 1:1.75, and spin-coated on the substrate at 6000 rpm for 40 seconds to have a 450 nm thickness, which was followed by a soft baking process at a temperature of about 110° C. for 1 minute. A HeCd laser (l=325 nm) was used as a light source, and a beam was filtered and diffracted through a 10-μm pinhole. A half portion of the diffracted light directly irradiated the PR and the other half was projected to the PR after reflection by a Lloyd's mirror that was placed perpendicular to the sample. These two beams interfered at a certain angle, which generated a sinusoidal exposure with a period of $\Lambda=\lambda_{UV}/2 \sin \theta$, where $\lambda_{UV}$ is the wavelength and $\theta$ is the half angle between the two beams. To generate a polymer template with a hole array, another subsequent interference exposure was performed after rotating the sample by 90 degrees. After a hard baking process was performed at a temperature of about 115° C. for 1 minute, non-exposed regions were removed during a development process.

Furthermore, the pitch size of the hole array could be controlled by an incident angle (A), and the diameter of hole openings could be adjusted by controlling the exposure time and/or the developing time.

Fabrication of ZnO Hemispheres

A Zn metal was deposited on the prepared polymer template by radio-frequency (RF) sputtering. The following lift-off process created an array of Zn metal dots, which were then oxidized into ZnO by submersion in 80 mL of a 20 mM solution of zinc nitrate hexahydrate mixed with 2 mL of 28 wt % ammonia in water at room temperature. The color of the Zn metal dots array changed from dark to transparent after 5 minutes in the oxidation solution, indicating the conversion to a ZnO dots array. A two-step hydrothermal growth method was then applied to form hemispherical crystals utilizing polarity-controlled growth.

Next, the ZnO dots array (as seeds) was dipped into a formulated culture solution composed of 70 mmol zinc nitrate hexahydrate ($Zn(NO_3)_2.6H_2O$) and 65 mmol hexamethylenetetramine (HMTA) to allow the growth of ZnO nanorods by a low temperature hydrothermal method (65° C., pH of 9.2). An urchin-like ZnO structure consisting of radial nanorods with a length of about 90 nm was formed in each ZnO dot.

If the c-axial growth rate was inhibited and the lateral growth rate was enhanced in the secondary growth step, ZHS crystals were anticipated. For this purpose, a culture solution was prepared for the secondary growth, containing 0.20 g of sodium citrate dihydrate (0.68 mmol, HOC(COONa)(CH$_2$COONa)$_2$.2H$_2$O) and 0.22 g of zinc nitrate hexahydrate (0.74 mmol) in 110 ml of DI water. When the urchin-like ZnO nanorod bundle was put into the solution at a pH higher than 9.7, above the isoelectric point (IEP) of ZnO (8.7 to 9.5), and maintained at a temperature of about 93° C. for about 12 hours, in general, the side planes of ZnO nanorods became electrochemically negative. As a result, the negatively charged citrate ions (HOC(COO$^-$)(CH$_2$COO$^-$)$_2$) were electrochemically adhered to the positively charged top planes (Zn$^{2+}$-terminated) of ZnO nanorods and thus their c-axial [0001] directional growth was retarded. In addition, the temperature (93° C.) increased the lateral growth rate, thereby enhancing mergers within the urchin-like ZnO nanorod bundle.

Figure 4:
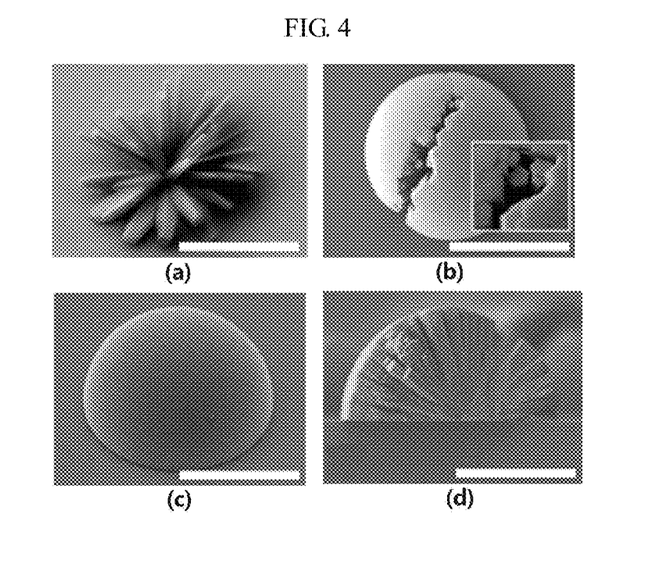
FIG. 4 shows field emission scanning electron microscope (FE-SEM) images indicating the growth of ZnO hemisphere (ZHS) over time and an FE-SEM image showing a cross-section of ZHS.

FIG. 4 shows field emission scanning electron microscope (FE-SEM) images (a to c) indicating the growth of ZHS over time and an FE-SEM image (d) of a cross-section of a ZHS (scale bar=150 nm). As shown in (a) to (c) of FIG. 4, an urchin-like ZnO nanorod bundle became a ZHS during a hydrothermal growth process. Also, as shown in the FE-SEM image of the cross-section of (d) of FIG. 4, it can be confirmed that the ZHS is composed of single crystalline ZnO nanorods.

Figure 5:
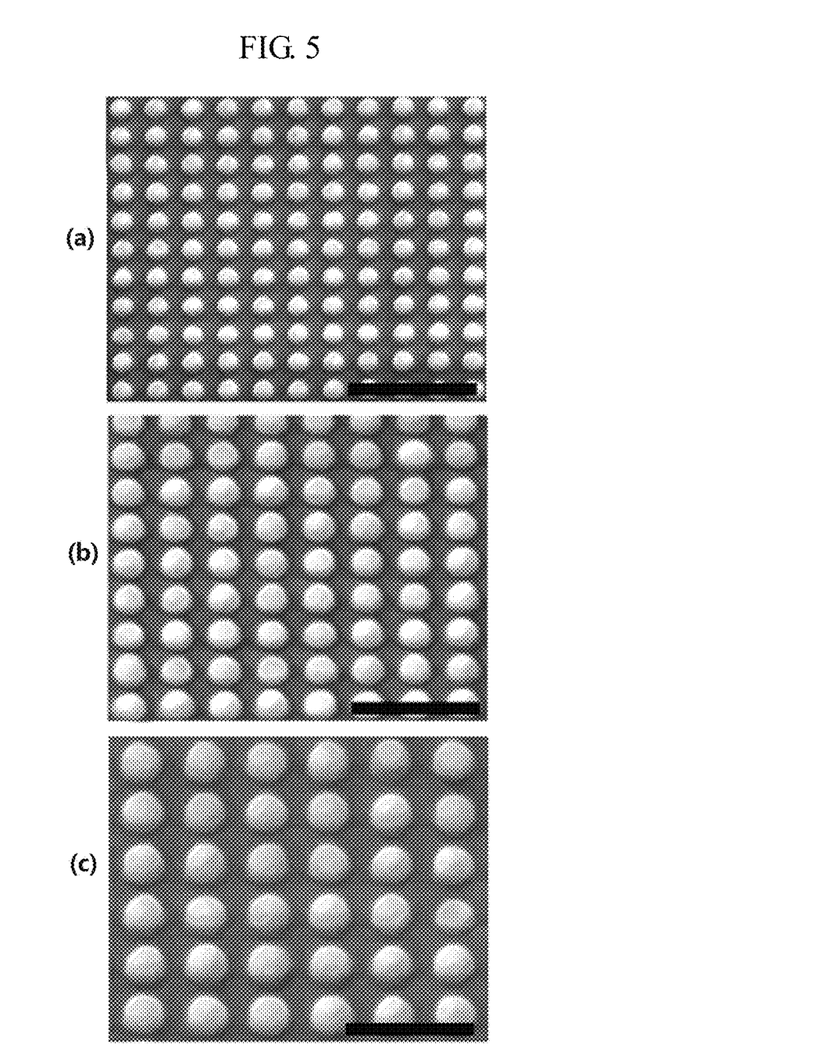
FIG. 5 shows FE-SEM images of ZHS arrays having various diameters and pitch sizes.

FIG. 5 shows FE-SEM images of ZHS arrays having various diameters and pitch sizes (scale bar=2 μm). It can be seen that three ZHS arrays with different diameters and pitch sizes are periodically aligned (hemisphere diameter and pitch size: (a) 150 nm, 300 nm; (b) 200 nm, 400 nm; (c) 250 nm, 500 nm). The diameter of the ZHS may be adjusted by controlling the exposure time and/or the developing time during fabrication of a polymer template, and the pitch size of the ZHS array was controlled by an incident angle (A) in laser interference lithography.

Fabrication of Photoelectrode and Cell

Mesoporous TiO$_2$ films were coated on an FTO (Pilkington, 8.0 Ω/cm$^2$) glass substrate with or without ZHS by a doctor-blade printing method using a commercially available TiO$_2$ paste (Ti-Nanoxide D$_{20}$, Solaronix, Aubonne, Switzerland), which was followed by a sintering procedure at a temperature of about 450° C. for 30 minutes under air. The TiO$_2$ films were coated on the FTO glass substrates with an identical thickness for all samples. The sintered electrodes were firstly treated with oxygen plasma (25 sccm, 25 mTorr, 25 W, 40 seconds) and then immersed in a solution of 50 mM N719 dye (Ruthenizer 535-bisTBA, Solaronix, Aubonne, Switzerland) in a 1:1 (v/v) mixture of acetonitrile and tert-butyl alcohol and kept for about 24 hours. The dye-adsorbed TiO$_2$ film/FTO electrode and 40 nm thick platinum catalytic electrodes deposited on the FTO glass substrate were assembled with a 30 μm gap using a spacer of Surlyn (Dupont). The compartment was backfilled through an entry port with an electrolyte, composed of 0.6 M 1-butyl-3-methylimidazolium iodide, 0.03 M I$_2$ (≥99.99%), 0.1 M guanidinium thiocyanate (99%) and 0.5 M 4-tert-butylpyridine (Fluka, 98%) in a mixture (volume ratio, 85:15) of acetonitrile (99.8%, anhydrous) and valeronitrile (99.5%).

For the Pt catalytic electrode, a Pt sol solution, a hydroxypropyl cellulose (HPC, 2 g/l) added solution (5.0 mM chloroplatinic acid hexahydrate (H$_2$PtCl$_6$), pH 2.0, Sigma Aldrich, Sydney, Australia), was spin-coated on an FTO glass substrate and subjected to thermal decomposition at a temperature of about 450° C. for about 1 hour, resulting in a 20 nm thick Pt layer. 1-methoxy-2-propanol (anhydrous, Aldrich) was used as a solvent. The size of the active area was about 1.66±0.02 cm$^2$.

Measurements of the Cell Characteristics

The cell performance was characterized with a Keithley 2400 source meter, while the samples were illuminated by AM 1.5 simulated sunlight (SANEI solar simulator, Class A) with a power density of 100±2.5 mW/cm$^2$. IPCE spectra were measured under the irradiation of a 300 W xenon lamp with an Oriel Cornerstone™ 260 ¼ m monochromator. The optical scattering spectra were measured with an ultraviolet-visible-near infrared (UV-VIS-NIR) spectrophotometer (Perkin Elmer Lambda 900) with an integrating sphere (Internal DRA-2500).

Figure 6:
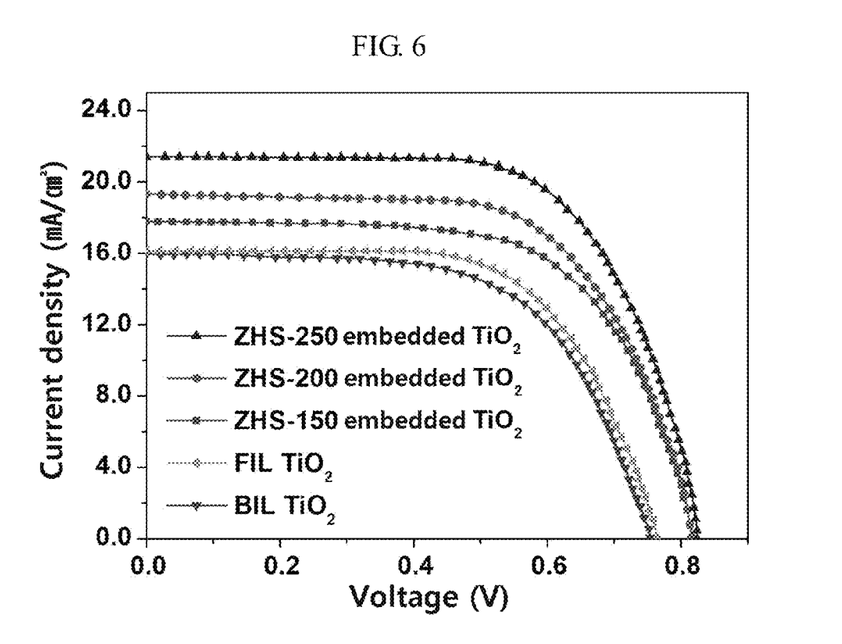
FIG. 6 is a graph showing current-voltage characteristics of DSSCs including four different photoelectrodes.

FIG. 6 shows current-voltage characteristics of a reference DSSC including only a TiO$_2$ photoelectrode and DSSCs including ZHS array-embedded TiO$_2$ photoelectrodes with different diameters. Here, the current-voltage characteristics of the reference DSSC were measured under front illumination (FIL) and back illumination (BIL), and the current-voltage characteristics of the DSSCs including the ZHS array-embedded TiO$_2$ photoelectrodes were measured under BIL. The FIL refers to illumination of sunlight to a photoelectrode, and the BIL refers to illumination of sunlight to a catalytic electrode.

Table 1 summarizes the photovoltaic properties of the DSSCs mentioned in FIG. 6.

TABLE 1

Photovoltaic properties of DSSCs with different photoelectrodes[a]

| Photo-electrode component | Film thickness [μm] | Cell area [cm$^2$] | Voc [mV] | Jsc [mA/cm$^2$] | Fill factor [%] | η [%] | Adsorbed dye [1 × 10$^{-8}$ mol/cm$^2$] |
|---|---|---|---|---|---|---|---|
| FIL TiO$_2$[b] | 12.14 | 1.675 | 765 | 16.14 | 66 | 8.15 | 15.69 |
| BIL TiO$_2$[c] |  |  | 755 | 15.96 | 63 | 7.59 |  |
| ZHS-150[d] | 12.21 | 1.642 | 819 | 17.78 | 61 | 8.88 | 15.11 |
| ZHS-200[e] | 12.36 | 1.647 | 816 | 19.32 | 60 | 9.46 | 12.33 |
| ZHS-250[f] | 12.52 | 1.665 | 824 | 21.42 | 63 | 11.12 | 11.78 |

[a]Radiant power: 100 mW/cm$^2$ (AM 1.5);
[b]Radiant direction: illumination to photoelectrode including only TiO$_2$;
[c,d,e,f]Radiant direction: illumination to Pt catalytic electrode;
[d,e,f]ZHS array-embedded TiO$_2$ photoelectrode (diameter:
[d]= 150 nm,
[e]= 200 nm,
[f]= 250 nm).

The reference DSSC assembled with only the TiO$_2$ photoelectrode exhibited a short-circuit current density (J$_{SC}$) of 16.14 mAcm$^{-2}$, an open circuit voltage (V$_{OC}$) of 765 mV, a fill factor (FF) of 66% and an overall conversion efficiency (η) of 8.15% under FIL. In comparison, the BIL measurement with the reference DSSC showed slightly decreased V$_{OC}$, J$_{SC}$, FF, and thus a lower η of 7.59% due to less light penetration through the Pt catalytic electrode. However, the discrepancy is not that much because in this study we specially adopted a Pt sol solution containing a polymeric additive, hydroxypropyl cellulose (HPC). The HPC dispersed Pt nanoparticles homogeneously on the FTO substrate after thermal decomposition, resulting in improved catalytic activity. Moreover, the fabricated Pt catalytic electrode showed superior transmittance over the whole visible wavelength to a conventional Pt catalytic electrode without an HPC additive.

Figure 7:
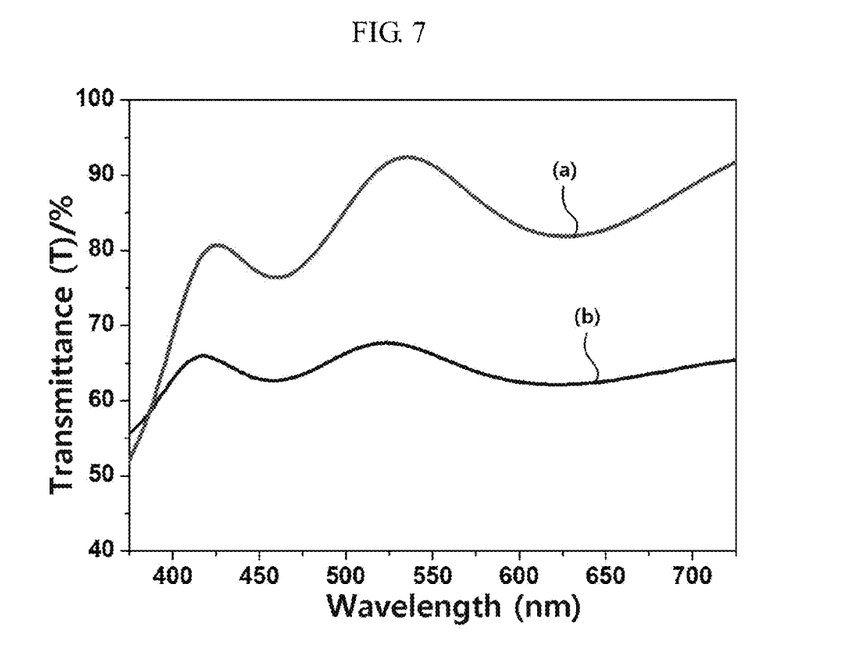
FIG. 7 is a graph showing transmittances of two different platinum (Pt) catalytic electrodes.

FIG. 7 is a graph showing transmittances of a Pt electrode (a) prepared using an HPC additive and a conventional Pt electrode (b) prepared without the HPC additive. The conventional Pt electrode was prepared by coating an H$_2$PtCl$_6$ solution (0.7 mM in isopropyl alcohol) onto an FTO glass substrate and sintering the solution at a temperature of about 400° C. for about 20 minutes, resulting in a 50 nm thick Pt layer.

Referring to FIG. 7, it was confirmed that the Pt electrode prepared using HPC, which is a cellulose polymer, exhibited excellent transmittance. Especially, the transmittance was over 90% at about 525 nm, which was the absorption range of N719 dye.

Referring back to Table 1, it can be seen that the DSSCs including the ZHS array-embedded $TiO_2$ photoelectrodes exhibited a higher PCE($\eta$) than the reference DSSC including only the $TiO_2$ photoelectrode.

The DSSC with the ZHS array (dia.=250 nm) embedded $TiO_2$ photoelectrode revealed the best device performance among the fabricated devices. The overall PCE ($\eta$) is enhanced by 46.5% compared to the reference cell under BIL, and by 36.4% under FIL. It should be noted that the photovoltaic properties improved with the size of the ZHS, which is directly related to the extent of light refection. But, the device performance deteriorated above a certain size of the ZHS due to the decreased dye loading amount as shown in Table 2.

TABLE 2

Photovoltaic properties of DSSCs including ZHS with different sizes[a]

| Photo-electrode component | Film thickness [μm] | Cell area [cm$^2$] | Voc [mV] | Jsc [mA/cm$^2$] | Fill factor [%] | $\eta$ [%] | Adsorbed dye [1 × 10$^{-8}$ mol/cm$^2$] |
|---|---|---|---|---|---|---|---|
| ZHS-250[b] | 12.52 | 1.665 | 824 | 21.42 | 63 | 11.12 | 11.78 |
| ZHS-500[c] | 12.63 | 1.658 | 809 | 14.87 | 61 | 7.34 | 9.87 |
| ZHS-1000[d] | 12.48 | 1.676 | 767 | 11.78 | 56 | 5.06 | 5.63 |

[a]Radiant power: 100 mW/cm$^2$ (AM 1.5), radiant direction: illumination to Pt catalytic electrode;
[b,c,d]ZHS array-embedded $TiO_2$ photoelectrode (diameter:
[b]= 250 nm,
[c]= 500 nm,
[d]= 1000 nm).

To find the amount of dye loading to the four different photoelectrodes shown in Table 1, the dye-adsorbed photoelectrodes were soaked in a 1.0 mM KOH solution for 24 hours to detach the dye molecules completely.

Figure 8:
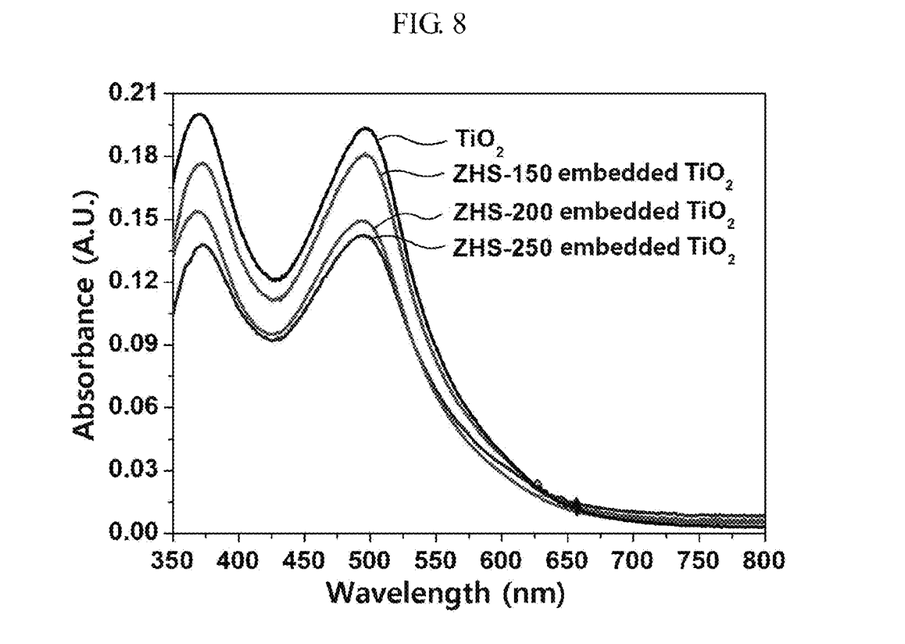
FIG. 8 is a graph showing the absorption spectra of dye molecules desorbed from four different photoelectrodes.

FIG. 8 is a graph showing the absorption spectra of dye molecules desorbed from four different photoelectrodes.

The absorption spectrum of the desorbed dye represents the amount of dye adsorbed to the photoelectrode. Four spectra show two peaks at 373 nm and 505 nm, which are blue-shifted from the original N719 dye absorption peaks. The blue-shift generally appears in alkaline solutions. In general, as the amount of dye adsorption increases, more light can be harvested, hence a larger photocurrent density. Interestingly, even though the ZHS array-embedded $TiO_2$ nanoparticulate films show less dye absorption than only the $TiO_2$ nanoparticulate film, the photovoltaic properties are much better. Such a significant increase in overall PCE can be ascribed to several explanations, which are experimentally proved in the following discussion.

In DSSCs, the short circuit current density is determined by the following factors: initial number of photo-generated carriers, injection efficiency of electrons from dye molecules to an oxide semiconductor, and the amount of electrons reaching the electrode without recombination between the injected electrons and oxidized dyes or redox species in the electrolyte. The initial number of photo-generated carriers is the most important factor, which is affected by the light-harvesting capability of the photoelectrodes with different film configurations.

Figure 9:
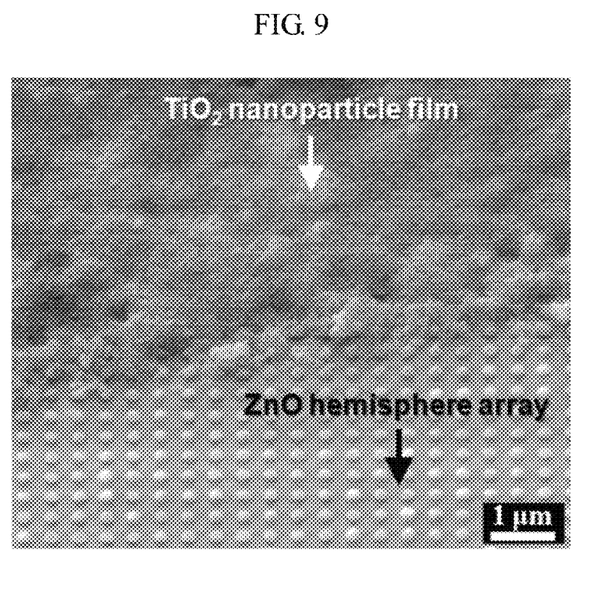
FIG. 9 is a 45°-tilted FE-SEM image of a ZHS array-embedded $TiO_2$ photoelectrode.

FIG. 9 shows a 45°-tilted FE-SEM image of a ZHS array-embedded $TiO_2$ photoelectrode. The SEM image was captured from an edge of the photoelectrode, revealing that a ZHS array was well covered with a $TiO_2$ nanoparticulate film.

Figure 10:
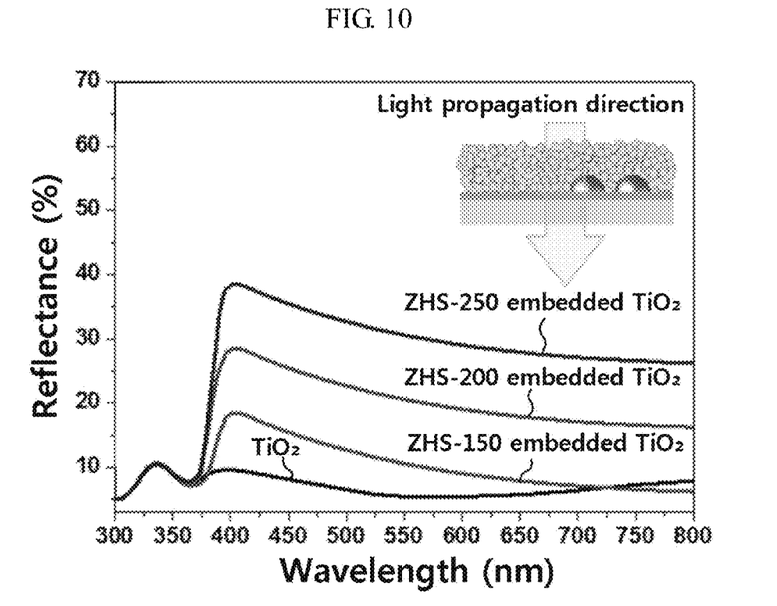
FIG. 10 is a graph showing the reflectances of four different photoelectrodes.

FIG. 10 is a graph showing the reflectances of a $TiO_2$ film and a $TiO_2$ film embedded with ZHS with different diameters. The inset figure of FIG. 10 shows a light propagation direction. Light scattering spectra showed that ZHS crystals acted as the effective scattering centers. Significant light reflection occurred from 400 nm to the visible range. More light is reflected accordingly with the size of ZHS, especially, the $TiO_2$ film embedded with the ZHS array with a diameter of about 250 nm shows the highest reflectance. This reflectance increases with the diameter size is in accordance with the enhancement of the photovoltaic performances as summarized in Table 1.

Figure 11:
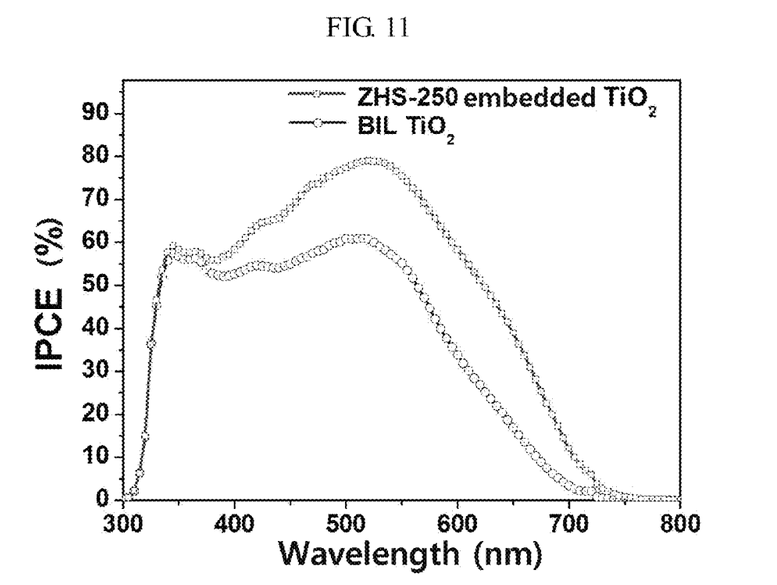
FIG. 11 is a graph showing incident photon-to-current conversion efficiency measurement (IPCE) values of DSSCs including two different photoelectrodes.

Incident photon-to-current conversion efficiency measurement (IPCE) was then performed to further confirm the scattering effect. FIG. 11 is a graph showing IPCE values of DSSCs including $TiO_2$ photoelectrodes with or without ZHS (here, the ZHS has a diameter of about 250 nm, and all the IPCE values of the DSSCs were measured under BIL). The IPCE value obtained from the ZHS array-embedded $TiO_2$ electrode is about 80%, approximately 1.6 times that of the only $TiO_2$ photoelectrode at 525 nm, corresponding to the N719 absorption peak. Considering the same photoelectrode film thickness and the lower dye loading, such an improved IPCE performance of the ZHS array-embedded $TiO_2$ photoelectrode in the wavelength range of about 400 to 800 nm should be primarily the result of increased light scattering owing to the ZHS, because the onset wavelength of the IPCE enhancement is coincident with that of reflection increase, as shown in FIG. 10.

Electrochemical impedance spectroscopy (EIS) is a powerful tool for interpreting the internal resistances or the electron transport within an electrochemical system. The EIS spectra of the DSSCs with the two different photoelectrodes were carried out at the frequency range of about $10^{-1}$ to $10^5$ Hz under one-sun illumination at $V_{OC}$ or in the dark at 0 V.

Figure 12:
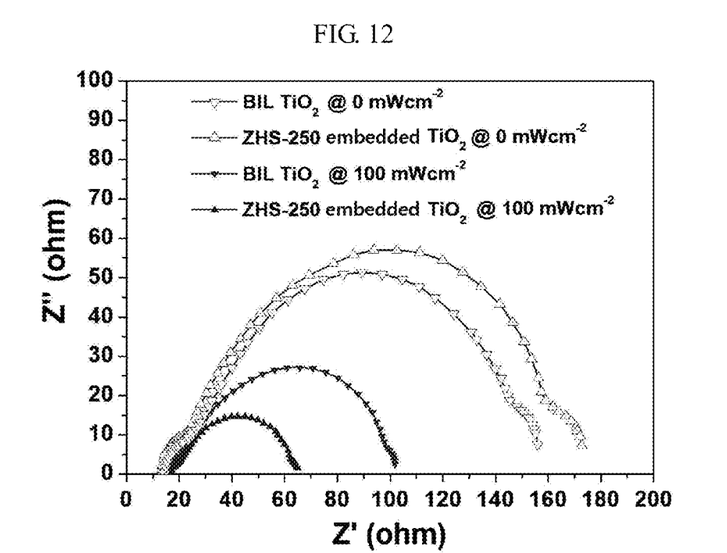
FIG. 12 shows the Nyquist plots obtained from DSSCs including two different photoelectrodes under one-sun illumination or in the dark.

FIG. 12 shows the Nyquist plots obtained from DSSCs including $TiO_2$ nanoparticulate photoelectrodes with or without ZHS under one-sun illumination or in the dark. The spectra show three distinguishable semicircles, which are related to the electrochemical reaction at the Pt catalytic electrode (in the kHz range), at the metal oxide film/dye/electrode (in the 1 to 1000 Hz range) and a Warburg diffusion process of $I^-/I_3^-$ (<1 Hz range) from left to right circle, respectively. The extent of electron transport in the photoelectrode can be judged by the impedance that is defined by the diameter of the middle semicircle. In the dark, the comparison of the middle semicircles indicates a decreased diameter in the order of the ZHS array-embedded $TiO_2$ photoelectrode and the $TiO_2$-only photoelectrode. This suggests that the ZHS within the $TiO_2$ nanoparticulate film contributed to the increase of charge transfer resistance in the dark. However, under one-sun illumination, the diameter of the middle semicircle of the ZHS array-embedded $TiO_2$ nanoparticulate film was much smaller than that of the $TiO_2$-only nanoparticulate film. This indicates less impedance because more free electrons are produced by the light scattering effect at the ZHS surfaces and rapidly transported to a collecting electrode (FTO electrode) through the crystalline hemisphere.

Figure 13:
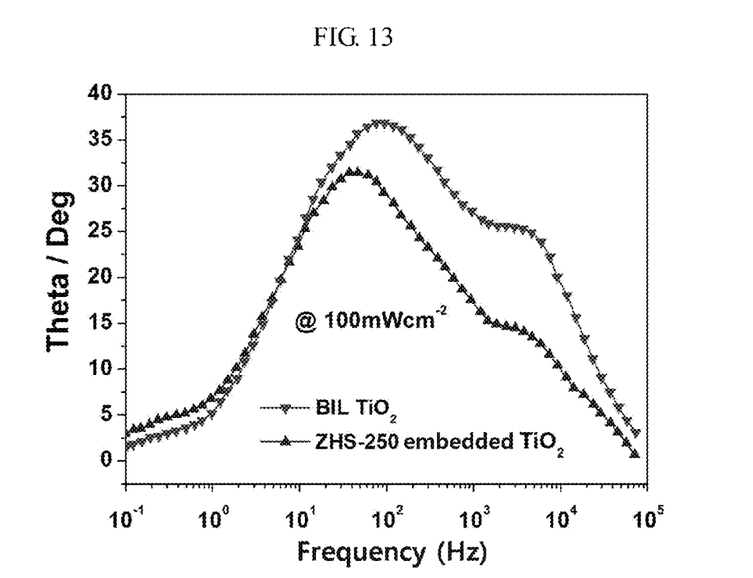
FIG. 13 shows Bode phase plots drawn from the Nyquist plots under illumination in FIG. 12.

Bode phase plots shown in FIG. 13 can be drawn from the Nyquist plots under illumination in FIG. 12. Two main frequency peaks and a slight frequency peak are observed. These peaks correspond to the charge transfer processes at different interfaces within the DSSCs. Interestingly, the max frequency peak in the intermediate frequency region, which is related to electron transfer in the ZHS array-embedded TiO$_2$ nanoparticulate film, is lower than that of the TiO$_2$-only nanoparticulate film. According to the EIS model developed by Kern et al., the lifetime ($\tau_e$) of electrons produced by light irradiation can be acquired from the following equation: $\tau_e = 1/\omega_{max} = 1/(2\pi f_{max})$, where $f_{max}$ is the maximum frequency of the intermediate frequency region. A decrease in $f_{max}$ corresponds to a longer electron lifetime and thus, a slower recombination to exhibit improved photovoltaic properties.

The $f_{max}$ values are 119.02 Hz and 37.42 Hz for the TiO$_2$-only photoelectrode and the ZHS array-embedded TiO$_2$ photoelectrode, respectively. This data suggests that the electron lifetime in the ZHS array-embedded TiO$_2$ photoelectrode is longer than that of the TiO$_2$-only photoelectrode. As there is no current passing through the external circuit at the $V_{OC}$ condition, electrons injected into the oxide semiconductor film must recombine with $I_3^-$ ions at the ZHS array-embedded TiO$_2$ film/dye/electrode interface. Therefore, the increase in the electron lifetime means that the produced electrons can diffuse further without interruption, such as recombination and trapping within the film. The Bode phase plots demonstrate that a slower recombination occurs in the ZHS array-embedded TiO$_2$ photoelectrode. The enhanced electron lifetime can be explained by the higher electron mobility through the single crystalline ZnO nanorods that form the ZHS, as shown in (d) of FIG. 4. The incorporation of ZHS within the TiO$_2$ photoelectrode not only generates more electrons by light scattering but also enhances electron mobility. These factors are directly related to the efficiency of DSSCs.

As described above, according to the present invention, light scattering effects of photoelectrodes can be increased due to the induction of ZHS. Also, the ZHS, which are aggregates of single crystalline nanorod structures, can have high electron mobility and minimize losses caused by recombination during a charge transport process. Accordingly, photovoltaic properties can be improved.

However, technical effects of the present invention are not limited to the above-described effects, and other unmentioned effects will be clearly understood by those of ordinary skill in the art.

While the example embodiments of the present invention and their advantages have been described in detail, it should be understood that various changes, substitutions and alterations may be made herein without departing from the scope of the invention.

What is claimed is:

1. A photoelectrode comprising:
   a conductive substrate;
   a zinc oxide nano structure pattern comprising a plurality of zinc oxide hemispheres disposed on the conductive substrate; and
   a porous metal oxide layer covering the zinc oxide nano structure pattern,
   wherein each of the plurality of zinc oxide hemispheres of the zinc oxide nano structure pattern includes a plurality of zinc oxide nanorods formed radially from a zinc oxide seed layer,
   wherein each of the plurality of zinc oxide nanorods has a single crystalline structure, and
   wherein each of the plurality of zinc oxide hemispheres of the zinc oxide nano structure pattern is filled with a zinc oxide material grown laterally from the zinc oxide nanorods to fill each gap between the zinc oxide nanorods.

2. The photoelectrode of claim 1, wherein the metal oxide layer includes at least one selected from the group consisting of titanium oxide, tin oxide, zinc oxide, tungsten oxide, zirconium oxide, strontium oxide, indium oxide, magnesium oxide, and aluminum oxide.

3. A dye-sensitized solar cell comprising:
   a photoelectrode of any one of claims 1 and 2;
   a photosensitive dye adsorbed on the photoelectrode;
   a catalytic electrode disposed opposite the photoelectrode; and
   an electrolyte interposed between the photoelectrode and the catalytic electrode.

4. The dye-sensitized solar cell of claim 3, wherein the catalytic electrode is formed by coating a transparent conductive substrate with a catalytic precursor solution containing metal salts and a cellulose-based polymer and thermally decomposing the cellulose-based polymer.

* * * * *